(12) United States Patent
Shiratori et al.

(10) Patent No.: US 7,674,744 B2
(45) Date of Patent: *Mar. 9, 2010

(54) CATALYST POWDER, METHOD OF PRODUCING THE CATALYST POWDER, AND EXHAUST GAS PURIFYING CATALYST

(75) Inventors: Kazuyuki Shiratori, Yokohama (JP); Toru Sekiba, Yokohama (JP); Katsuo Suga, Yokohama (JP); Masanori Nakamura, Yokosuka (JP); Hironori Wakamatsu, Yokosuka (JP); Hirofumi Yasuda, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1123 days.

This patent is subject to a terminal disclaimer.

(21) Appl. No.: 11/079,377

(22) Filed: Mar. 15, 2005

(65) Prior Publication Data

US 2005/0221978 A1 Oct. 6, 2005

(30) Foreign Application Priority Data

Mar. 31, 2004 (JP) .............................. 2004-106667

(51) Int. Cl.
*B01J 23/00* (2006.01)
*B01J 21/00* (2006.01)
*B01J 20/00* (2006.01)
*B01J 29/00* (2006.01)

(52) U.S. Cl. ...................... 502/327; 502/245; 502/252; 502/258; 502/261; 502/262; 502/302; 502/303; 502/304; 502/324; 502/328; 502/330; 502/331; 502/332; 502/333; 502/334; 502/339; 502/346; 502/349; 502/350; 502/351; 502/355; 502/415; 502/439

(58) Field of Classification Search ................. 502/302, 502/303, 304, 327, 328, 330, 331, 332, 333, 502/334, 245, 252, 258, 261, 262, 324, 339, 502/346, 349, 350, 351, 355, 415, 439
See application file for complete search history.

(56) References Cited

U.S. PATENT DOCUMENTS 2,980,662 A 4/1961 Jezl (Continued)

FOREIGN PATENT DOCUMENTS

EP 0 466 984 A1 1/1992

(Continued)

OTHER PUBLICATIONS

T. Kinoshita et al., "Magnetic evaluation of nanostructure of gold—iron composite particles synthesized by a reverse micelle method," Journal of Alloys and Compounds, vol. 359, No. 1-2, Sep. 22, 2003, pp. 46-50.

(Continued)

*Primary Examiner*—Cam N Nguyen
(74) *Attorney, Agent, or Firm*—Foley & Lardner LLP

(57) ABSTRACT

A method of producing catalyst powder of the present invention has a step of precipitating a carrier in a reversed micelle, and a step of precipitating at least one of a noble metal particle and a transition metal particle in the reversed micelle in which the carrier is precipitated. By this method, it is possible to obtain catalyst powder excellent in heat resistance and high in the catalytic activity.

8 Claims, 8 Drawing Sheets

U.S. PATENT DOCUMENTS

| | | | |
|---|---|---|---|
| 3,255,020 A | 6/1966 | Ferrell | |
| 3,266,477 A | 8/1966 | Stiles | |
| 3,271,322 A | 9/1966 | Stiles | |
| 3,357,916 A | 12/1967 | Smith | |
| 3,388,077 A | 6/1968 | Hoekstra | |
| 3,478,329 A | 11/1969 | De Rudnay | |
| 3,531,329 A | 9/1970 | Selwitz | |
| 3,649,566 A * | 3/1972 | Hayes et al. | 502/313 |
| 4,255,289 A | 3/1981 | Balinsky et al. | |
| 4,255,290 A | 3/1981 | Flagg et al. | |
| 4,261,862 A | 4/1981 | Kinoshita et al. | |
| 4,274,981 A | 6/1981 | Suzuki et al. | |
| 4,369,132 A | 1/1983 | Kinoshita et al. | |
| 4,374,046 A | 2/1983 | Antos | |
| 4,425,261 A | 1/1984 | Stenius et al. | |
| 4,440,874 A | 4/1984 | Thompson | |
| 4,444,721 A | 4/1984 | Ohkata | |
| RE31,719 E | 10/1984 | Sonetaka et al. | |
| 4,495,304 A | 1/1985 | Yoo et al. | |
| 4,539,311 A | 9/1985 | Harrison et al. | |
| 4,548,921 A | 10/1985 | Geus et al. | |
| 4,585,752 A | 4/1986 | Ernest | |
| 4,714,693 A | 12/1987 | Targos | |
| 4,716,087 A | 12/1987 | Ito et al. | |
| 4,738,947 A * | 4/1988 | Wan et al. | 502/304 |
| 4,758,418 A | 7/1988 | Yoo et al. | |
| 4,765,874 A | 8/1988 | Modes et al. | |
| 4,793,797 A | 12/1988 | Kato et al. | |
| 4,839,146 A * | 6/1989 | Cho et al. | 423/213.5 |
| 4,857,499 A | 8/1989 | Ito et al. | |
| 4,904,633 A | 2/1990 | Ohata et al. | |
| 4,969,265 A | 11/1990 | Ehara | |
| 5,039,647 A | 8/1991 | Ihara et al. | |
| 5,068,218 A | 11/1991 | Nishizawa | |
| 5,108,469 A | 4/1992 | Christ | |
| 5,112,787 A | 5/1992 | Falke et al. | |
| 5,122,496 A | 6/1992 | Vorlop et al. | |
| 5,248,650 A | 9/1993 | Sekiba et al. | |
| 5,318,757 A | 6/1994 | Abe et al. | |
| 5,395,406 A | 3/1995 | Clavenna et al. | |
| 5,427,989 A | 6/1995 | Kanesaka et al. | |
| 5,446,003 A | 8/1995 | Augustine et al. | |
| 5,516,741 A | 5/1996 | Gascoyne et al. | |
| 5,610,117 A * | 3/1997 | Horiuchi et al. | 502/324 |
| 5,622,048 A | 4/1997 | Aoyama et al. | |
| 5,640,847 A | 6/1997 | Nakajima et al. | |
| 5,644,912 A | 7/1997 | Kawamura | |
| 5,677,258 A | 10/1997 | Kurokawa et al. | |
| 5,750,458 A | 5/1998 | Kennelly et al. | |
| 5,814,576 A | 9/1998 | Yamamoto | |
| 5,814,577 A | 9/1998 | Park et al. | |
| 5,849,660 A | 12/1998 | Takemoto et al. | |
| 5,911,961 A * | 6/1999 | Horiuchi et al. | 423/213.5 |
| 5,916,839 A | 6/1999 | Pak et al. | |
| 5,977,012 A | 11/1999 | Kharas et al. | |
| 6,047,544 A | 4/2000 | Yamamoto et al. | |
| 6,057,263 A | 5/2000 | Takahashi et al. | |
| 6,066,410 A | 5/2000 | Auer et al. | |
| 6,066,587 A | 5/2000 | Kurokawa et al. | |
| 6,069,111 A | 5/2000 | Yamamoto et al. | |
| 6,080,371 A | 6/2000 | Tanabe et al. | |
| 6,083,467 A | 7/2000 | Takeshima et al. | |
| 6,107,239 A | 8/2000 | Qin et al. | |
| 6,110,862 A | 8/2000 | Chen et al. | |
| 6,172,000 B1 * | 1/2001 | Chattha et al. | 502/324 |
| 6,180,075 B1 * | 1/2001 | Lindner et al. | 423/213.2 |
| 6,221,805 B1 | 4/2001 | Yamashita et al. | |
| 6,228,800 B1 | 5/2001 | Yamaguchi et al. | |
| 6,284,201 B1 | 9/2001 | Buck | |
| 6,296,813 B1 | 10/2001 | Ishii et al. | |
| 6,306,794 B1 | 10/2001 | Suzuki et al. | |
| 6,335,305 B1 | 1/2002 | Suzuki et al. | |
| 6,370,870 B1 | 4/2002 | Kamijo et al. | |
| 6,440,378 B1 | 8/2002 | Hirata et al. | |
| 6,444,610 B1 | 9/2002 | Yamamoto | |
| 6,475,446 B1 | 11/2002 | Horiike et al. | |
| 6,503,862 B1 | 1/2003 | Yamamoto | |
| 6,511,642 B1 | 1/2003 | Hatanaka et al. | |
| 6,514,905 B1 | 2/2003 | Hanaki et al. | |
| 6,518,213 B1 | 2/2003 | Yamamoto et al. | |
| 6,569,803 B2 | 5/2003 | Takeuchi | |
| 6,589,901 B2 | 7/2003 | Yamamoto et al. | |
| 6,623,716 B2 | 9/2003 | Suga et al. | |
| 6,660,897 B1 | 12/2003 | Martchal-George et al. | |
| 6,680,279 B2 | 1/2004 | Cai et al. | |
| 6,729,125 B2 | 5/2004 | Suga et al. | |
| 6,756,336 B2 | 6/2004 | Kasahara et al. | |
| 6,764,665 B2 | 7/2004 | Deeba et al. | |
| 6,787,500 B2 | 9/2004 | Ito et al. | |
| 6,800,388 B2 | 10/2004 | Kaneko et al. | |
| 6,861,387 B2 | 3/2005 | Ruth et al. | |
| 6,887,443 B2 | 5/2005 | Suga et al. | |
| 6,887,444 B1 | 5/2005 | Yamamoto | |
| 6,896,857 B2 | 5/2005 | Nakamura et al. | |
| 6,926,875 B2 | 8/2005 | Hatanaka et al. | |
| 6,956,007 B2 | 10/2005 | Cai et al. | |
| 6,967,183 B2 | 11/2005 | Hampden-Smith et al. | |
| 7,029,514 B1 | 4/2006 | Yang et al. | |
| 7,041,866 B1 | 5/2006 | Gillespie | |
| 7,081,430 B2 | 7/2006 | Uenishi et al. | |
| 7,081,431 B2 | 7/2006 | Yamashita et al. | |
| 7,150,861 B2 | 12/2006 | Morita et al. | |
| 7,351,679 B2 | 4/2008 | Eri et al. | |
| 2001/0004832 A1 | 6/2001 | Hanaki et al. | |
| 2001/0006934 A1 | 7/2001 | Kachi et al. | |
| 2001/0021358 A1 | 9/2001 | Kikuchi et al. | |
| 2002/0045543 A1 | 4/2002 | Takatori et al. | |
| 2003/0004054 A1 | 1/2003 | Ito et al. | |
| 2003/0083193 A1 | 5/2003 | Takaya et al. | |
| 2003/0167752 A1 | 9/2003 | Niwa et al. | |
| 2003/0181316 A1 | 9/2003 | Hiramoto et al. | |
| 2004/0055280 A1 | 3/2004 | Nishizawa et al. | |
| 2004/0254069 A1 | 12/2004 | Ito | |
| 2005/0170958 A1 | 8/2005 | Kikuchi et al. | |
| 2005/0215429 A1 | 9/2005 | Wakamatsu et al. | |
| 2007/0153390 A1 | 7/2007 | Nakamura et al. | |
| 2007/0155626 A1 | 7/2007 | Yasuda et al. | |
| 2007/0167319 A1 | 7/2007 | Shiratori et al. | |
| 2007/0203021 A1 | 8/2007 | Nakamura et al. | |
| 2007/0244001 A1 | 10/2007 | Wakamatsu et al. | |

FOREIGN PATENT DOCUMENTS

| | | |
|---|---|---|
| EP | 0 466 984 A1 | 1/1992 |
| EP | 0 931 590 B1 | 7/1999 |
| EP | 0 940 176 A2 | 9/1999 |
| EP | 1 043 065 A1 | 10/2000 |
| EP | 1 494 304 A1 | 1/2005 |
| JP | 56-010333 A | 2/1981 |
| JP | 58-186441 A | 10/1983 |
| JP | 07-246343 A | 12/1984 |
| JP | 59-230639 A | 12/1984 |
| JP | 09-122492 A | 5/1997 |
| JP | 10-216517 A | 8/1998 |
| JP | 11-057473 A | 3/1999 |
| JP | 11-314035 A | 11/1999 |
| JP | 2000-001119 A | 1/2000 |
| JP | 2000-015098 A | 1/2000 |
| JP | 2000-042411 A | 2/2000 |
| JP | 2000-279824 A | 10/2000 |
| JP | 2000-296339 A | 10/2000 |
| JP | 2001-198466 A | 7/2001 |
| JP | 3251009 B2 | 11/2001 |
| JP | 2002-066335 A | 3/2002 |

| | | | |
|---|---|---|---|
| JP | 2002-102703 A | 4/2002 | |
| JP | 2002-233755 A | 8/2002 | |
| JP | 2002-355558 A | 12/2002 | |
| JP | 2002-361086 A | 12/2002 | |
| JP | 2003-080077 A | 3/2003 | |
| JP | 2003-126694 A | 5/2003 | |
| JP | 2003-144923 A | 5/2003 | |
| JP | 2003-164764 A | 6/2003 | |
| JP | 2003-181290 A | 7/2003 | |
| JP | 2003-181293 A | 7/2003 | |
| JP | 2003-290658 A | 10/2003 | |
| JP | 2003-290667 A | 10/2003 | |
| JP | 2003-311128 A | 11/2003 | |
| JP | 2004-016838 A | 1/2004 | |
| JP | 2004-043217 A | 2/2004 | |
| JP | 2004-082000 A | 3/2004 | |
| JP | 2004-174490 A | 6/2004 | |
| JP | 2004-267961 A | 9/2004 | |
| JP | 2005-081183 A | 3/2005 | |
| JP | 2005-305300 A | 11/2005 | |
| WO | WO-95/32790 A1 | 12/1995 | |
| WO | WO-97/09114 A1 | 3/1997 | |
| WO | WO-2005/063390 A1 | 7/2005 | |
| WO | WO 2005/063391 A1 | 7/2005 | |
| WO | WO-2005/063391 A1 | 7/2005 | |

OTHER PUBLICATIONS

U.S. Appl. No. 11/079,270, filed Mar. 15, 2005, Wakamatsu et al.
U.S. Appl. No. 11/079,377, filed Mar. 15, 2005, Shiratori.
U.S. Appl. No. 11/722,275, filed Jun. 20, 2007, Nakamura et al.
A. Martinez-Arias et al., "Study of the lean NOx reduction with C3H6 in the presence of water over silver/alumina catalysts prepared from inverse microemulsions," Applied Catalysts B: Environmental, vol. 28, 2000, pp. 29-41.
H. Wakamatsu et al., US PTO Office Action U.S. Appl. No. 11/578,295, Mar. 19, 2009, 8 pgs.
H. Wakamatsu et al., US PTO Office Action U.S. Appl. No. 11/578,295, Oct. 2, 2008, 15 pgs.
H. Wakamatsu, et al., US PTO Office Action U.S. Appl. No. 11/079,270, Mar. 4, 2009, 6 pgs.
H. Wakamatsu, et al., US PTO Office Action U.S. Appl. No. 11/079,270, May 12, 2008, 7 pgs.
H. Wakamatsu, et al., US PTO Office Action U.S. Appl. No. 11/079,270, Jul. 21, 2008, 5 pgs.
H. Wakamatsu, et al., US PTO Office Action U.S. Appl. No. 11/079,270, Aug. 25, 2008, 20 pgs.
H. Yasuda et al., US PTO Office Action U.S. Appl. No. 10/586,533, dated Jul. 14, 2008, 6 pgs.
H. Yasuda et al., US PTO Office Action U.S. Appl. No. 10/586,533, dated Nov. 18, 2008, 16 pgs.
K. Shiratori, et al., US PTO Office Action U.S. Appl. No. 10/584,346, dated Jul. 11, 2008, 5 pgs.
K. Shiratori, et al., US PTO Office Action U.S. Appl. No. 10/584,346, dated Nov. 18, 2008, 19 pgs.
M. Che et al., "A Study of the Chemisorption of Nitric Oxide on PdY Zeolite, Evidence for a Room Temperature Oxidative Dissolution of Pd Crystallities," The Journal of Physical Chemistry, vol. 60, No. 21, 1976, 11 pgs.
M. Nakamura et al. US PTO Office Action U.S. Appl. No. 10/589,890, dated Jul. 15, 2008, 5 pgs.
M. Nakamura et al. US PTO Office Action U.S. Appl. No. 10/589,890, dated Nov. 19, 2008, 13 pgs.
M. Nakamura et al. US PTO Office Action U.S. Appl. No. 10/584,243, dated Aug. 6, 2008, 5 pgs.
M. Nakamura et al. US PTO Office Action U.S. Appl. No. 10/584,243, dated Dec. 26, 2008, 24 pgs.
M. Nakamura et al., US PTO Office Action, Notice of Allowance U.S. Appl. No. 10/589,890, dated May 7, 2009, 13 pgs.
Ph. Buffat and J-P Borel, "Size effect on the melting temperature of gold particles," Physical Review A, Jun. 1976, vol. 13, No. 6, 12 pgs.
R. Willis, "Pumice, Porous Volcanic Rock," Online, XP002364316, URL:http://ceramic-materials.com/cermat/material/2009.html>.
S. Eriksson, et al., "Preparation of Catalysts from Microemulsions and Their Applications in Heterogeneous Catalysis," Applied Catalysis A: General, vol. 265, No. 2, Jul. 8, 2004, pp. 207-219.
T. Kinoshita et al., "Magnetic evaluation of nanostructure of gold—iron composite particles synthesized by a reverse micelle method," Journal of Alloys and Compounds, vol. 359, No. 1-2, Sep. 22, 2003, pp. 46-50.
T. Shimizu et al., "Size Evolution of Alkanethiol-Protected Gold Nanoparticles by Heat Treatment in the Solid State", J. Phys. Chem. B, 107, 2003, pp. 2719-2724.
W.Y. Kim et al., "Methanol synthesis from syngas over supported palladium catalysts prepared using water-in-oil microemulsion," Applied Catalysis A: General, vol. 169, 1998, pp. 157-164.
Masanori Nakamura et al., PTO Notice of Allowance, U.S. Appl. No. 10/584,243, Jun. 11, 2009, 15 pages.
Hirofumi Yasuda et al., PTO Notice of Allowance, U.S. Appl. No. 10/586,533, Jun. 12, 2009, 14 pages.
H. Yamada et al., US PTO Notice of Allowance, U.S. Appl. No. 10/586,533, dated Jun. 12, 2009, 14 pgs.
M. Nakamura et al., US PTO Notice of Allowance, U.S. Appl. No. 10/589,890, dated May 7, 2009, 13 pgs.
M. Nakamura et al., US PTO Notice of Allowance, U.S. Appl. No. 10/584,243, dated Jun. 11, 2009, 14 pgs.
Wakamatsu, U.S. PTO Office Action, U.S. Appl. No. 11/079,270, dated Aug. 7, 2009, 13 pgs.
Nakamura et al., U.S. PTO Office Action, U.S. Appl. No. 11/722,275, dated Sep. 14, 2009, 23 pgs.

* cited by examiner

FIG.2A
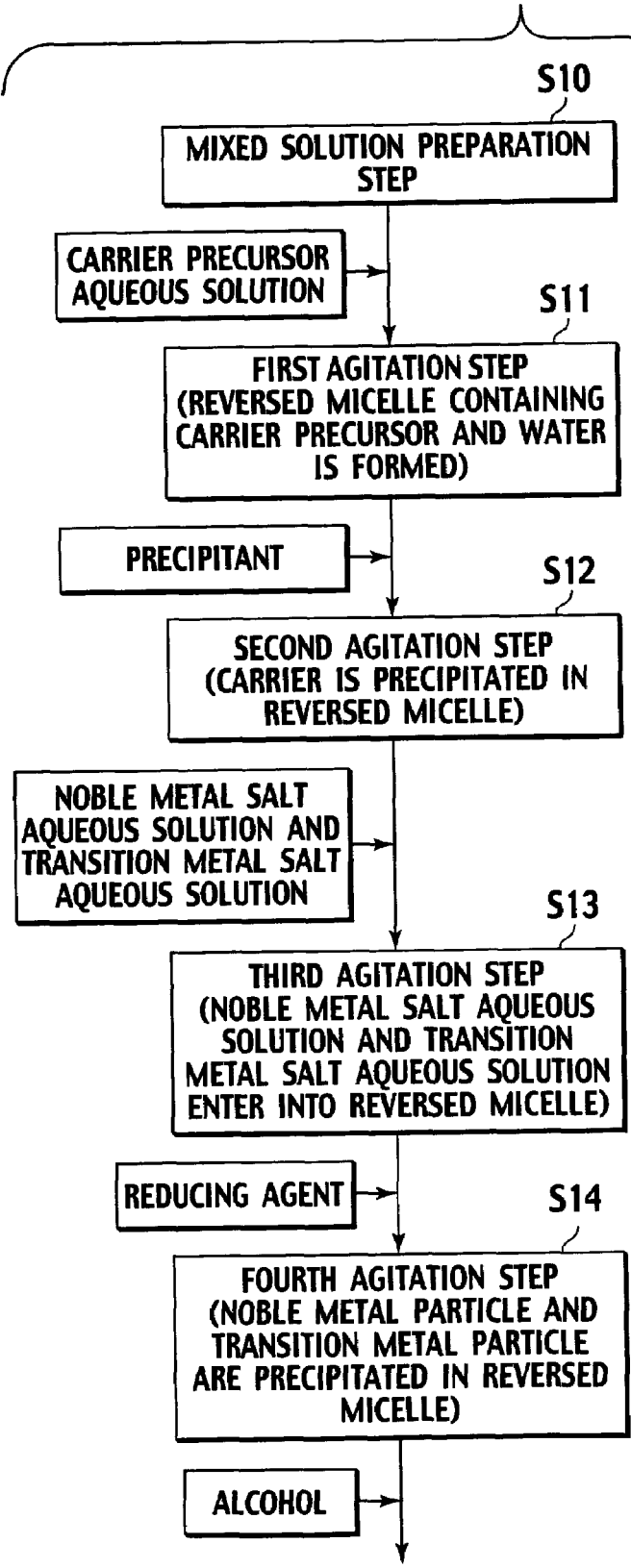
(a)
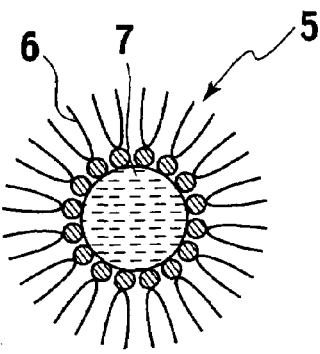
(b)
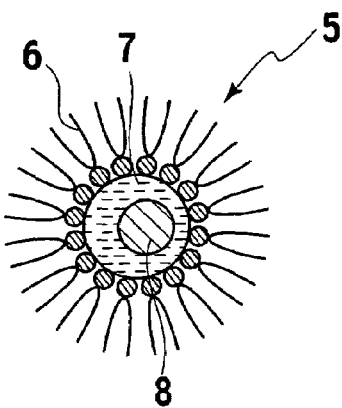
(c)
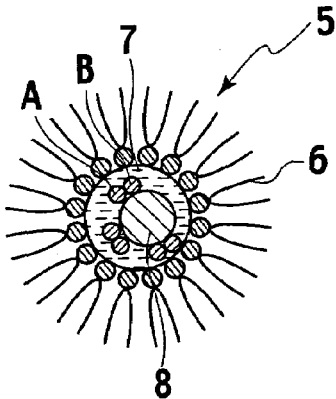

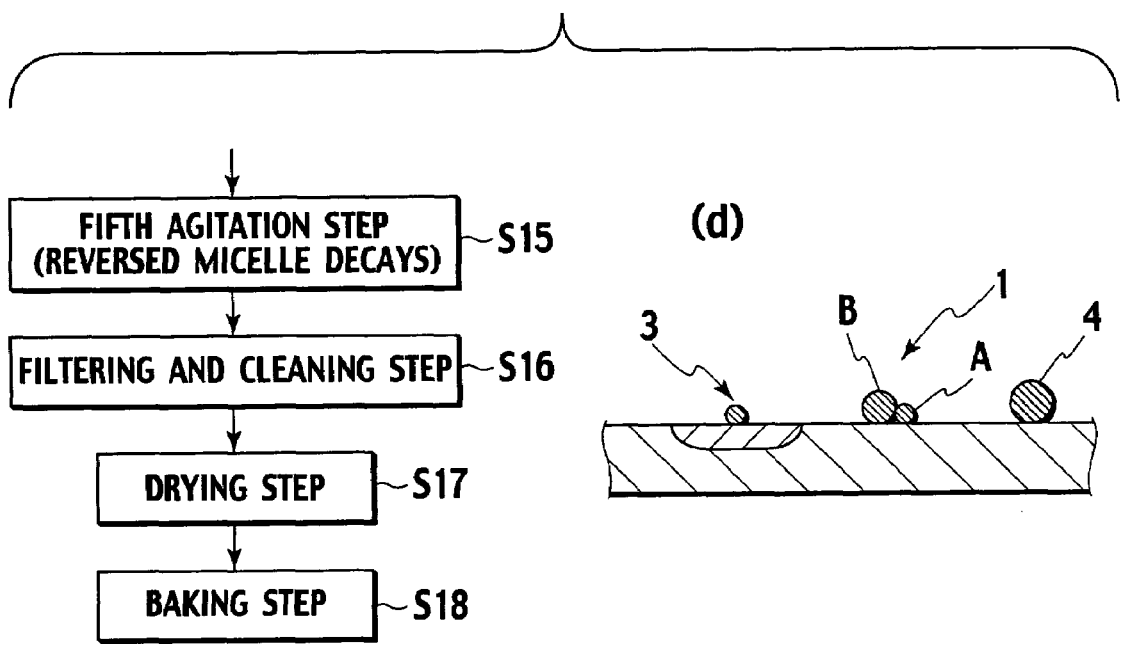

FIG.7

| | CARRIER | | NOBLE METAL | | | TRANSITION METAL | | | ADDITIONAL ELEMENT | | COATING AMOUNT ON SUBSTRATE (g/L) | NOBLE METAL PARTICLE DIAMETER AFTER BAKING (nm) | TRANSITION METAL PARTICLE DIAMETER AFTER BAKING (nm) | NOx PURIFICATION RATE (%) |
|---|---|---|---|---|---|---|---|---|---|---|---|---|---|---|
| ELEMENT | PRECURSOR | PRECIPITANT | ELEMENT | CARRYING CONCENTRATION (% by weight) | REDUCING AGENT | ELEMENT | CARRYING CONCENTRATION (% by weight) | REDUCING AGENT | ELEMENT | CARRYING CONCENTRATION (% by weight) | | | | |
| Ex.1 | Al | ALUMINUM ISOPROPOXIDE | - | Pt | 1.00 | $N_2H_4$ | Co | 5.00 | $N_2H_4$ | - | - | 100 | 4.5 | 30 | 54 |
| Ex.2 | Al | ALUMINUM NITRATE | AMMONIA WATER | Pt | 1.00 | $N_2H_4$ | Co | 5.00 | $N_2H_4$ | - | - | 100 | - | - | 53 |
| Ex.3 | Al | ALUMINUM ISOPROPOXIDE | - | Pt | 1.00 | $NaBH_4$ | Co | 5.00 | $N_2H_4$ | - | - | 100 | - | - | 52 |
| Ex.4 | Al+Ce | ALUMINUM NITRATE + CERIUM NITRATE | AMMONIA WATER | Pt | 1.00 | $N_2H_4$ | Co | 5.00 | $N_2H_4$ | - | - | 100 | - | - | 58 |
| Ex.5 | Al+La | ALUMINUM NITRATE + LANTHANUM NITRATE | AMMONIA WATER | Pt | 1.00 | $N_2H_4$ | Fe | 5.00 | $N_2H_4$ | - | - | 100 | - | - | 55 |
| Ex.6 | Al | ALUMINUM ISOPROPOXIDE | - | Pt | 1.00 | $N_2H_4$ | Co | 5.00 | $N_2H_4$ | Ce | 5.00 | 100 | - | - | 51 |
| Ex.7 | Al | ALUMINUM ISOPROPOXIDE | - | Pt / Rh | 1.00 / 0.20 | $N_2H_4$ | Zr | 5.00 | $N_2H_4$ | - | - | 100 | - | - | 59 |
| Ex.8 | Al | ALUMINUM ISOPROPOXIDE | - | Pd | 0.50 | $N_2H_4$ | Fe | 5.00 | $N_2H_4$ | - | - | 100 | - | - | 50 |
| Ex.9 | Al | ALUMINUM ISOPROPOXIDE | - | Pt | 0.30 | $N_2H_4$ | Co | 5.00 | $N_2H_4$ | - | - | 100 | - | - | 42 |
| Ex.10 | Si | TETRAETHYL ORTHOSILICATE | - | Pt | 1.00 | $N_2H_4$ | Co | 5.00 | $N_2H_4$ | - | - | 100 | - | - | 43 |
| Ex.11 | Ti | TITANIUM TETRAISOPROPOXIDE | - | Pt | 1.00 | $N_2H_4$ | Co | 5.00 | $N_2H_4$ | - | - | 100 | - | - | 41 |
| Com. Ex.1 | Al | - | - | Pt | 1.00 | - | Co | 5.00 | - | - | - | 100 | 11.1 | 55 | 40 |
| Com. Ex.2 | Al | ALUMINUM ISOPROPOXIDE | - | Pt | 1.00 | $N_2H_4$ | Co | 5.00 | $NH_3$ | - | - | 100 | - | - | 44 | ably
CATALYST POWDER, METHOD OF PRODUCING THE CATALYST POWDER, AND EXHAUST GAS PURIFYING CATALYST

BACKGROUND OF THE INVENTION

1. Field of the Invention

The present invention relates to catalyst powder suitable for an exhaust gas purifying catalyst which purifies exhaust gas discharged from an internal combustion engine, and to a method of producing the catalyst powder.

2. Description of the Related Art

In recent years, research and development on a catalyst which purifies exhaust gas have been progressed in various ways. As such an exhaust gas purifying catalyst, there is one which carries, as catalyst activators, noble metal such as platinum (Pt) and palladium (Pd) and transition metal such as cobalt (Co) and cerium (Ce) on a carrier formed of a porous body of alumina ($Al_2O_3$) or the like. As a method of carrying the catalyst activators on the carrier, there is an impregnation method, an SPC method and the like.

In the impregnation method, the catalyst activators such as the noble metal and the transition metal are first dissolved in pure water to make an aqueous solution, the carrier is immersed in the aqueous solution to adsorb the noble metal and the like onto the carrier, followed by drying and baking, thereby preparing catalyst powder. However, an adsorption site on a surface of the carrier is limited, and accordingly, there have been limitations on an improvement of dispersivity of the catalyst activators on the carrier surface. Therefore, the catalyst activators cannot be highly dispersed, and it has been thus impossible to obtain a high catalytic activity.

In this connection, a method of enhancing the catalytic activity has been developed, in which the catalyst activators such as the noble metal carried on the carrier is atomized to increase specific surface areas thereof. For example, a method of producing the catalyst powder is disclosed, in which the catalyst activators are prepared in micelles by use of a reversed micelle method (microemulsion) (Japanese Patent Laid-Open Publication No. 2000-42411). In this technology, first, a micelle containing the noble metal therein and a micelle containing the other element such as the transition metal therein are individually prepared. Subsequently, the respective micelles individually prepared are dropped in a solution containing aluminum isopropoxide as a carrier precursor, and an obtained solution is subjected to hydrolysis, the baking and the like, thereby preparing the catalyst powder.

SUMMARY OF THE INVENTION

However, in the disclosed related art, because noble metal particles and transition metal particles are prepared in the separate micelles in advance and solutions containing the respective reversed micelles are mixed together to prepare the catalyst powder, a case occurs where the noble metal and the transition metal do not exist in one reversed micelle. Then, when the noble metal particles and the transition metal particles are carried on the carrier, a contact ratio of the noble metal particles and the transition metal particles is lowered to a great extent. Accordingly, an improvement of exhaust gas purification performance by the contact of the noble metal and the transition metal is not brought about, and an effect of adding the transition metal will not be exerted sufficiently. Specifically, even if the noble metal particles and the transition metal particles are highly dispersed on the carrier, the transition metal does not contact the noble metal, and accordingly, it becomes difficult for the transition metal to exert the exhaust gas purification performance.

Moreover, in the related art, the noble metal particles exist singly on the carrier, and accordingly, sintering of the noble metal becomes prone to occur when the catalyst powder is exposed to high temperature conditions. Moreover, when the noble metal particles exist singly on the carrier, the carrier and the noble metal become prone to form a composite oxide. Accordingly, the related art has had a possibility that the catalytic activity is significantly lowered.

The present invention has been made in order to solve the foregoing problems. It is an object of the present invention to provide catalyst powder excellent in heat resistance and high in the catalytic activity, a method of producing the catalyst powder, and an exhaust gas purifying catalyst using the catalyst powder.

The first aspect of the present invention provides catalyst powder comprising: a porous carrier; and a noble metal particle and a transition metal particle, which are carried on the carrier, wherein at least a part of the transition metal particle contacts the noble metal particle, is bound with the carrier to form a composite compound, or forms a composite particle together with the noble metal particle.

The second aspect of the present invention provides a method of producing catalyst powder comprising: precipitating a carrier in a reversed micelle; and precipitating at least one of a noble metal particle and a transition metal particle in the reversed micelle in which the carrier is precipitated.

The third aspect of the present invention provides a method of producing catalyst powder comprising: preparing a reversed micellar solution having a reversed micelle which contains a carrier precursor solution therein; precipitating a carrier in the reversed micelle by mixing a precipitant into the reversed micellar solution; after the carrier is precipitated, mixing a noble metal salt aqueous solution and a transition metal salt aqueous solution into the reversed micellar solution; and precipitating at least any one of a noble metal particle and a transition metal particle in the reversed micelle by mixing a reducing agent into the reversed micellar solution.

The fourth aspect of the present invention provides a method of producing catalyst powder comprising: preparing a reversed micellar solution having a reversed micelle which contains water therein; precipitating a carrier in the reversed micelle by mixing metal alkoxide which is a carrier precursor into the reversed micellar solution; after the carrier is precipitated, mixing a noble metal salt aqueous solution and a transition metal salt aqueous solution into the reversed micellar solution; and precipitating at least any one of a noble metal particle and a transition metal particle in the reversed micelle by mixing a reducing agent into the reversed micellar solution.

BRIEF DESCRIPTION OF THE DRAWINGS

The invention will now be described with reference to the accompanying drawings wherein;

FIGS. 2A and 2B are process charts showing steps of a method of producing the catalyst powder according to the embodiment of the present invention;

FIG. 7 is a table showing configurations and evaluation results of the catalyst powders of Examples and Comparative examples.

DETAILED DESCRIPTION OF THE PREFERRED EMBODIMENT

Hereinafter, description will be made of embodiments of the present invention with reference to the drawings.

(Catalyst Powder)

Figure 1:
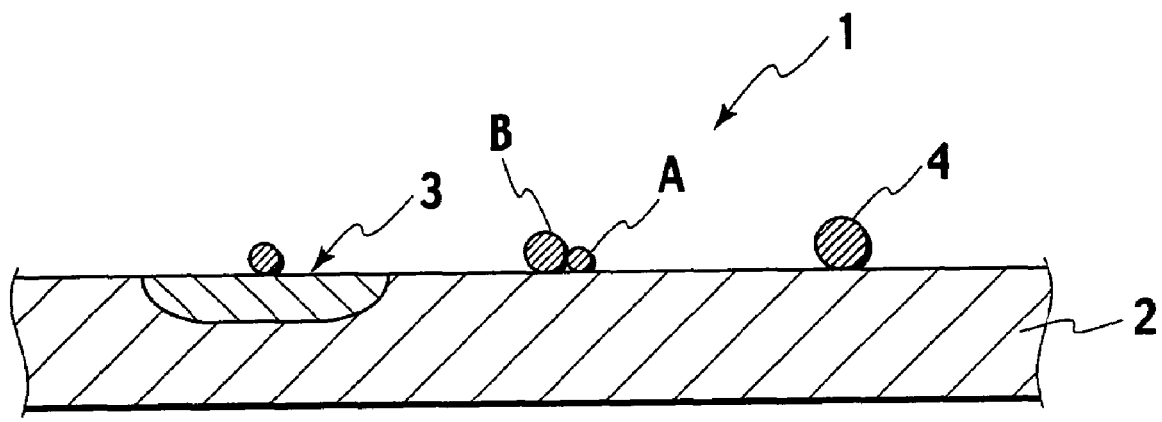
FIG. 1 is a cross-sectional view of catalyst powder according to an embodiment of the present invention.

FIG. 1 shows catalyst powder according to an embodiment of the present invention. Catalyst powder 1 of the present invention carries noble metal articles A and transition metal particles B on a single porous carrier 2, and the noble metal and the transition metal partially contact each other. Specifically, at least a part of the transition metal particle B contacts the noble metal particle A, is bound with the carrier 2 to form a composite compound 3, or forms a composite particle 4 together with the noble metal particles A. Note that, though description is made as "on the carrier", this implies both "on the surface of the carrier" and "in the inside of the carrier". Note that the transition metal exists in a state of a composite compound, metal (zero-valence), an alloy or the like as well as a simple oxide.

As described above, the noble metal and the transition metal are made to contact each other and evenly dispersed on the single carrier 2, and an intrinsic catalytic activity of the noble metal is thus enhanced. Detailed reasons why the catalytic activity of the noble metal is enhanced are unknown. However, in the case of using the catalyst powder with the above-described configuration as the exhaust gas purifying catalyst, reaction gas reaches the transition metal also in the stoichiometric range, though the transition metal usually has a low catalytic activity singly. Then the transition metal and the reaction gas contact each other, and the transition metal turns to a reduced state where the catalytic activity is easily obtained. Therefore, it is conceived that the catalytic activity makes a quantum improvement with the above-described configuration in comparison with the case of using the noble metal singly.

Moreover, in the above-described catalyst powder 1, it is preferable that a particle diameter of the noble metal particles A range from 0.1 nm to 10 nm and that a particle diameter of the transition metal particles B range from 1 nm to 50 nm. By setting the particle diameters of the noble metal particles and the transition metal particles in the above-described ranges, the catalytic activity can be enhanced sufficiently. Note that a more preferable particle diameter of the noble metal particles A ranges from 0.1 nm to 6.0 nm, and that a more preferable particle diameter of the transition metal particles B ranges from 1 nm to 35 nm.

Furthermore, in the above-described catalyst powder, it is preferable that the noble metal be at least one or more elements selected from the group consisting of ruthenium (Ru), rhodium (Rh), palladium (Pd), silver (Ag), iridium (Ir), platinum (Pt) and gold (Au). Among the noble metals given as examples, Pt, Rh and Pd are preferable, and Pt is particularly preferable. Moreover, two or more of these may be used as the noble metal, and for example, a combination of Pt—Rh or Pd—Rh is preferable.

Moreover, in the above-described catalyst powder, it is preferable that the transition metal be at least one or more elements selected from the group consisting of iron (Fe), cobalt (Co), nickel (Ni), copper (Cu) and manganese (Mn). Among the transition metals given as examples, Fe, Co and Ni are preferable, and Co is particularly preferable. Although reasons why Co is preferable are unknown, it is conceived that, because Co particularly takes various valences among the transition metals, Co has a function to enhance the catalytic activity of the noble metal by changing the valence of its own and supplying electrons to the noble metal. Moreover, two or more of these may be used as the transition metal, and for example, Fe—Co, Fe—Ni or the like can be used as a combination. In the case of using two or more of the transition metals as described above, it is preferable that precursors of the transition metals, which are mixed at the time of producing the catalyst powder, be same kind of salt, such as nitrate thereof.

Furthermore, though not shown in FIG. 1, in the above-described catalyst powder, it is preferable to carry, on carrier particles, a compound containing at least one or more elements selected from the group consisting of cerium (Ce), neodymium (Nd), praseodymium (Pr), lanthanum (La), zirconium (Zr), barium (Ba) and magnesium (Mg). Moreover, it is also possible to combine two or more of the elements given as examples, and Ce—Zr, La—Ce or the like can be used as a combination. By carrying the compound containing the elements as described above on the carrier, the purification performance of the catalyst powder can be enhanced. For example, when La and the like are added, these elements enter into crystal lattices of the carrier, and there is obtained an effect of restricting lowering of a specific surface area of the carrier, which is accompanied with aggregation or phase transition of the carrier particles. Furthermore, when Ce, Zr and the like are added, the stoichiometric range can be expanded by oxygen storage capacity thereof.

Moreover, in the above-described catalyst powder, it is preferable that the carrier 2 be formed of at least one or more compounds selected from the group consisting of alumina, ceria, titania, zirconia and silica, and that the carrier 2 be the porous body. Use of an oxide high in heat resistance makes it possible to restrict sintering of the noble metal particles and the transition metal particles. Moreover, use of the porous body as the carrier makes it possible to carry the noble metal particles and the transition metal particles thereon with high dispersivity.

(Method of Producing Catalyst Powder)

Next, a method of producing catalyst powder according to the embodiment of the present invention is described.

The catalyst powder of the present invention is produced by use of a reversed micelle method. Moreover, the production method of the present invention is characterized by including a first step of first precipitating the carrier in a reversed micelle, and a second step of precipitating, after the first step, the noble metal particle and the transition metal particle in the reversed micelle in which the carrier is precipitated. In this production method, the carrier, the noble metal particle and the transition metal particle are precipitated in the single reversed micelle, and accordingly, the noble metal particle and the transition metal particle become easy to contact each other, and the transition metal and the carrier becomes easy to form the composite compound. Moreover, in the production method of the present invention, the carrier is first precipitated in the reversed micelle, and the noble metal particle and the transition metal particle are then precipitated therein. Accordingly, the noble metal and the transition metal become easy to turn to a mutual contact state. As a result, highly active catalyst powder can be obtained.

The production method is described in detail by use of FIG. 2A and FIG. 2B.

First, a solution is prepared, in which a surfactant is dissolved in an organic solvent (Step S10). To the solution thus mixed, an aqueous solution is added, in which the carrier precursor is dissolved, and a mixture thus obtained is agitated (Step S11). In such a way, as shown in Illustration (a), a surfactant 6 is arrayed on the periphery of a spherical droplet with a diameter of approximately 20 nm, and in an aqueous phase in an inside of the droplet, a reversed micelle 5 containing an aqueous solution 7 which contains the carrier precursor is formed.

Next, a precipitant is added to the mixed solution containing the reversed micelle, and an obtained mixture is agitated (Step S12). In such a way, the precipitant enters into the reversed micelle, the carrier precursor is insolubilized to become the carrier particle, and as shown in Illustration (b), a carrier particle 8 is precipitated in the reversed micelle 5.

Moreover, to the mixed solution containing the reversed micelle, an aqueous solution containing noble metal salt as a precursor of the noble metal particle and transition metal salt as a precursor of the transition metal particle is added, and an obtained mixture is agitated (Step S13). In such a way, the noble metal salt aqueous solution and the transition metal salt aqueous solution enter into the reversed micelle 5.

Subsequently, a reducing agent is added to the mixed solution containing the reversed micelle, and an obtained mixture is agitated (Step S14). In such a way, the reducing agent enters into the reversed micelle 5, and reduces the noble metal salt and the transition metal salt. Then, as shown in Illustration (c), the noble metal particles A and the transition metal particles B are attached onto the outer periphery of the carrier particle 8 in the reversed micelle 5.

Next, alcohol is added to the mixed solution containing the reversed micelle, and an obtained mixture is agitated (Step S15). The alcohol (methanol and the like) is added, and thus the droplet cannot maintain a shape thereof in the organic solvent. Accordingly, the reversed micelle decays. Then, a composite compound is obtained, in which the noble metal particles A and the transition metal particles B are attached onto the outer periphery of the carrier particle 8.

Next, the composite compound thus obtained is filtered by means of a membrane filter, and is then cleaned by use of alcohol and water. Thus, impurities (surfactant and the like) contained in such a precipitate are removed (Step S16). Moreover, the composite compound thus processed is dried (Step S17), and is then baked in airflow (Step S18). In such a way, the above-described catalyst powder can be obtained, in which the noble metal particles A and the transition metal particles B surely contact each other.

It is known that, in the above-described method of producing catalyst powder, the diameter of the reversed micelle formed by using the reversed micelle method is substantially determined by a ratio of the surfactant and the water contained in the reversed micelle. Accordingly, in the case of preparing the reversed micellar solution, it is preferable to set a molar ratio RW ([water]/[surfactant]) of the water to the surfactant within a range of 5 to 30, and particularly, within a range of 10 to 20. Note that the water here also includes water molecules contained in hydrates in the metal salts. The reason why the molar ratio RW is regulated within the above-described range is as follows. Specifically, when the molar ratio exceeds the upper limit value, it becomes difficult to form the reversed micelle, and when the molar ratio RW becomes lower than the lower limit value, it becomes difficult to introduce activators such as the noble metal and the transition metal into the reversed micelle. Note that, in each of Examples to be described later, the catalyst powder was prepared with the molar ratio RW (water/surfactant) set at 20 unless otherwise specified.

Moreover, in the above-described method of producing catalyst powder, the carrier precursor is precipitated in the reversed micelle. Accordingly, in comparison with the conventional carrier produced without using the reversed micelle method, catalyst can be obtained, in which not only the specific surface area is large but also the lowering of the specific surface area is small under high temperature conditions and the heat resistance is excellent. In general, it is preferable that the specific surface area of the carrier be large. However, in the conventional carrier, the specific surface area is significantly decreased under the high temperature conditions when the specific surface area concerned is large. Accordingly, the catalyst activators simultaneously carried aggregate, and the activity of the catalyst powder is lowered. In order to maintain a catalytic activity at the time of producing the catalyst powder, it is preferable to use a carrier capable of maintaining a large specific surface area even at the high temperature. Specifically, it is preferable that the specific surface area be 150 $m^2/g$ or more after the carrier is baked for 3 hours in airflow of 600° C., and the specific surface area of 200 $m^2/g$ or more is particularly preferable. The specific surface area of the carrier produced by the production method of the present invention is 200 $m^2/g$ or more even when the carrier is baked under the above-described conditions. Accordingly, the aggregation of the noble metal particles and the transition metal particles can be restricted, and the catalytic activity at the time of producing the catalyst powder can be maintained.

Furthermore, in Step S13 and Step S14 in the above-described method of producing catalyst powder, the noble metal salt aqueous solution and the transition metal salt aqueous solution are mixed into the reversed micellar solution, and then the noble metal and the transition metal are simultaneously precipitated in the single reversed micelle. When the simultaneous precipitation is performed in such a way, the noble metal and the transition metal are attached onto the carrier surface in the reversed micelle, and the noble metal and the transition metal are evenly dispersed on the carrier. Accordingly, a contact area of the noble metal and the transition metal is increased to enhance the catalytic activity, and therefore, it is preferable that the noble metal and the transition metal be precipitated simultaneously. However, the step of recipitating the noble metal particles and the transition metal particles is not limited to the method of precipitating the noble metal and the transition metal simultaneously. For example, a method may be adopted, in which the noble metal salt aqueous solution is first mixed into the reversed micellar solution, a reducing agent is then mixed thereinto to precipitate the noble metal, and next, the transition metal salt aqueous solution is mixed into the reversed micellar solution, and a reducing agent is then mixed thereinto to precipitate the transition metal. Alternatively, a method may be adopted, in which the transition metal salt aqueous solution is first mixed into the reversed micellar solution to precipitate the transition metal, and next, the noble metal salt aqueous solution is then mixed thereinto to precipitate the noble metal.

Moreover, in a micro-space of the reversed micelle, of which diameter ranges from several to several ten nanometers, the carrier, the noble metal and the transition metal are mixed together, and the noble metal and the transition metal are precipitated. Accordingly, the catalyst powder can be obtained, in which the noble metal and the transition metal are evenly carried on the carrier.

Furthermore, in the above-described production steps, for the purpose of enhancing the heat resistances of the carrier and the noble metal, the compounds, each containing at least one or more elements selected from the above-described group consisting of Ce, Nd, Pr, La, Zr, Ba and Mg, can be precipitated in the reversed micelle. In the case of carrying the compounds on the carrier, the compounds may be carried in the reversed micelle simultaneously by use of salts of the same elements, or the compounds can be sequentially carried therein one by one. Moreover, without being carried in the reversed micelle, the compounds can also be carried in a manner that the catalyst powder obtained by the above-described production method is impregnated in an aqueous solution in which the compounds concerned, each containing at least one or more elements selected from the group consisting of Ce, Nd, Pr, La, Zr, Ba and Mg, is dissolved, followed by baking.

In the production method shown in FIG. 2A and FIG. 2B, the precipitant is added to the reversed micelle containing the carrier precursor solution therein, thereby precipitating the carrier. However, even if the precipitant is not used, the carrier can be precipitated in the reversed micelle by using, as the carrier precursor, a metal alkoxide which causes hydrolysis instantaneously after contacting water. Specifically, the surfactant is first dissolved in the organic solvent, thereby preparing a mixed solution. Subsequently, water is added to the mixed solution, and a reversed micelle containing only the water therein is formed. Thereafter, a solution of the metal alkoxide (aluminum isopropoxide and the like) is added to the reversed micellar solution thus obtained. Thus, the metal alkoxide enters into the reversed micelle, and reacts with the water in the reversed micelle, and the carrier is thus precipitated in the reversed micelle. Steps that follow are similar to the steps shown in FIG. 2A and FIG. 2B. In the case of adding the metal alkoxide, it is preferable to dissolve the metal alkoxide in the organic solvent such as cyclohexane.

Materials for use in the above-described method of producing catalyst powder are described below.

As the organic solvent of the reversed micellar solution, usable are cyclohexane, methylcyclohexane, cycloheptane, heptanol, octanol, dodecyl alcohol, cetyl alcohol, isooctane, n-heptane, n-hexane, n-decane, benzene, toluene, xylene, and the like. Moreover, a mixed solution of two or more of these solvents may be used.

As the surfactant of the reversed micellar solution, usable are polyoxyethylene nonylphenyl ether, magnesium laurate, zinc caprate, zinc myristate, sodium phenylstearate, aluminum dicaprylate, tetraisoamylammonium thiocyanate, n-octadecyltri-n-butylammonium formate, n-amyltri-n-butylammonium iodide, sodium bis(2-ethylhexyl)succinate, sodium dinonylnaphthalenesulfonate, calcium cetylsulfate, dodecylamine oleate, dodecylamine propionate, cetyltrimethylammonium bromide, stearyltrimethylammonium bromide, cetyltrimethylammonium chloride, stearyltrimethylammonium chloride, dodecyltrimethylammonium bromide, octadecyltrimethylammonium bromide, dodecyltrimethylammonium chloride, octadecyltrimethylammonium chloride, didodecyldimethylammonium bromide, ditetradecyldimethylammonium bromide, didodecyldimethylammonium chloride, ditetradecyldimethylammonium chloride, (2-octyloxy-1-octyloxymethyl)polyoxyethylene ethyl ether, and the like. Moreover, two or more of these surfactants may be used in a mixed manner.

As the carrier precursor, usable are aluminum nitrate, cerium nitrate, titanium tetraisopropoxide, tetraethyl orthosilicate, aluminum isopropoxide, and the like. Moreover, in order to enhance the heat resistance of the carrier, aluminum nitrate and cerium nitrate, aluminum nitrate and lanthanum nitrate, and the like may be used in a mixed manner.

As the noble metal salt, usable are a dinitrodiammine platinum (II) nitrate solution, a hexachloroplatinate (IV) acid solution, a hexaammine platinum (IV) tetrachloride solution, a palladium chloride solution, a palladium nitrate solution, a dinitrodiammine palladium dichloride solution, a rhodium chloride solution, a rhodium nitrate solution, a ruthenium chloride solution, a ruthenium nitrate solution, a hexachloroiridium acid solution, and the like.

As the precipitant, usable are ammonia water, tetramethylammonium hydroxide (TMAH), sodium hydroxide, and the like.

As the reducing agent, usable are hydrazine, sodium thiosulfate, citric acid, sodium citrate, L-ascorbic acid, sodium borohydride, formic acid, formaldehyde, methanol, ethanol, ethylene, vitamin B, and the like. Moreover, two or more of these may be used in a mixed manner.

(Exhaust Gas Purifying Catalyst)

It is preferable to use the catalyst powder produced by the above-described method of producing catalyst powder for the exhaust gas purifying catalyst. The exhaust gas purifying catalyst is exposed to such high temperature conditions ranging from 500° C. to 600° C. Accordingly, the lowering of the purification performance is prone to occur. However, in the catalyst powder produced by use of the above-described production method, the particles of the activators are evenly dispersed on the carrier, and the high heat resistance is imparted thereto. Hence, the catalytic activity at the time of production can be maintained during use thereof for a long period.

Although specific descriptions are made below by use of Examples and Comparative examples, the catalyst powder of the present invention is not limited to illustrated Examples.

EXAMPLE 1

Figure 3:
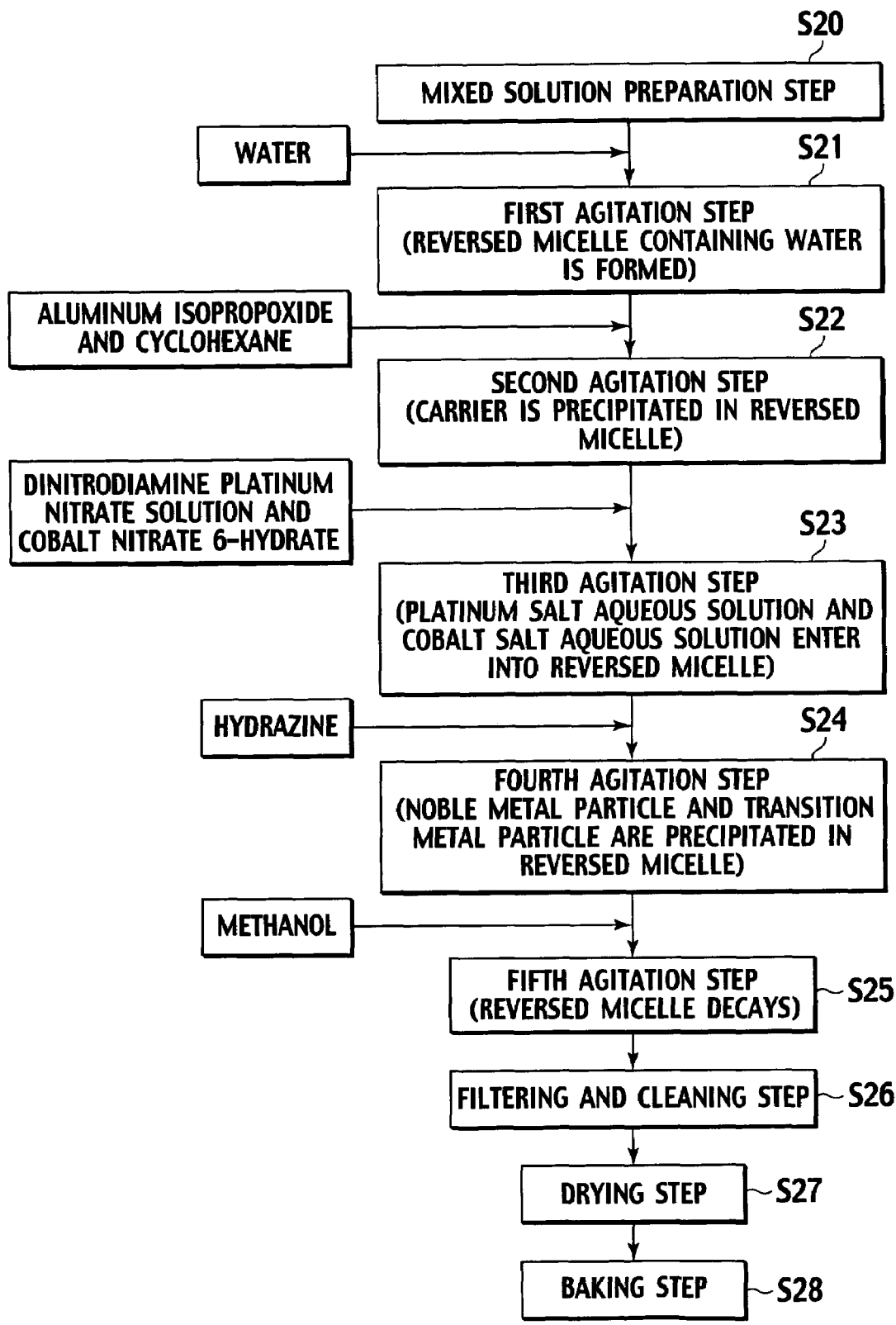
FIG. 3 is a process chart showing a method of producing catalyst powder of Example 1.

As shown in FIG. 3, in Example 1, aluminum isopropoxide was used as the carrier precursor, and platinum and cobalt were reduced simultaneously, thereby preparing catalyst powder.

5000 ml of cyclohexane was added as the solvent to 330 g of polyethylene glycol-mono-4-nonylphenyl ether as the surfactant, and thus a solution containing 0.15 mol/L of the surfactant was prepared (Step S20). Moreover, pure water was added to the solution, and a reversed micellar solution containing water therein was prepared (Step S21).

To the reversed micellar solution thus prepared, a solution obtained by mixing 20 ml of cyclohexane and 20 g of aluminum isopropoxide was added, and an obtained mixture was agitated for approximately two hours. Subsequently, the aluminum isopropoxide was subjected to hydrolysis in a reversed micelle, and a reversed micellar solution containing aluminum hydroxide in the reversed micelle was thus prepared (Step S22).

Next, to the reversed micellar solution, a mixed solution was added, in which 0.60 g of a dinitrodiamine platinum nitrate solution (platinum concentration: 8.46% by weight) and 1.3 g of cobalt nitrate 6-hydrate powder were dissolved as the noble metal and the transition metal, respectively, into pure water. An obtained mixture was then agitated for approximately two hours. In such a way, a reversed micelle containing aluminum hydroxide therein, and further containing platinum salt and cobalt salt, was prepared (Step S23).

0.71 g of hydrazine was added as the reducing agent into the obtained reversed micellar solution, and platinum particles and cobalt particles were precipitated simultaneously. An obtained mixture was further agitated for approximately two hours (Step S24).

Subsequently, 500 ml of methanol was added to the reversed micellar solution, and an obtained mixture was agitated for approximately two hours. The reversed micelle thus decays, and platinum, cobalt and the carrier were deposited (Step S25). Thereafter, the deposit was filtered to be separated from the solvent, and a deposit thus obtained was cleaned by alcohol and pure water, thereby removing impurities such as an extra surfactant (Step S26). The deposit was dried at 100° C. for 12 hours (Step S27), followed by baking at 400° C. in airflow (Step S28). In such a way, catalyst powder was obtained, in which Pt of 1.00% by weight and Co of 5.00% by weight were carried with respect to 1 g of $Al_2O_3$.

EXAMPLE 2

Figure 4:
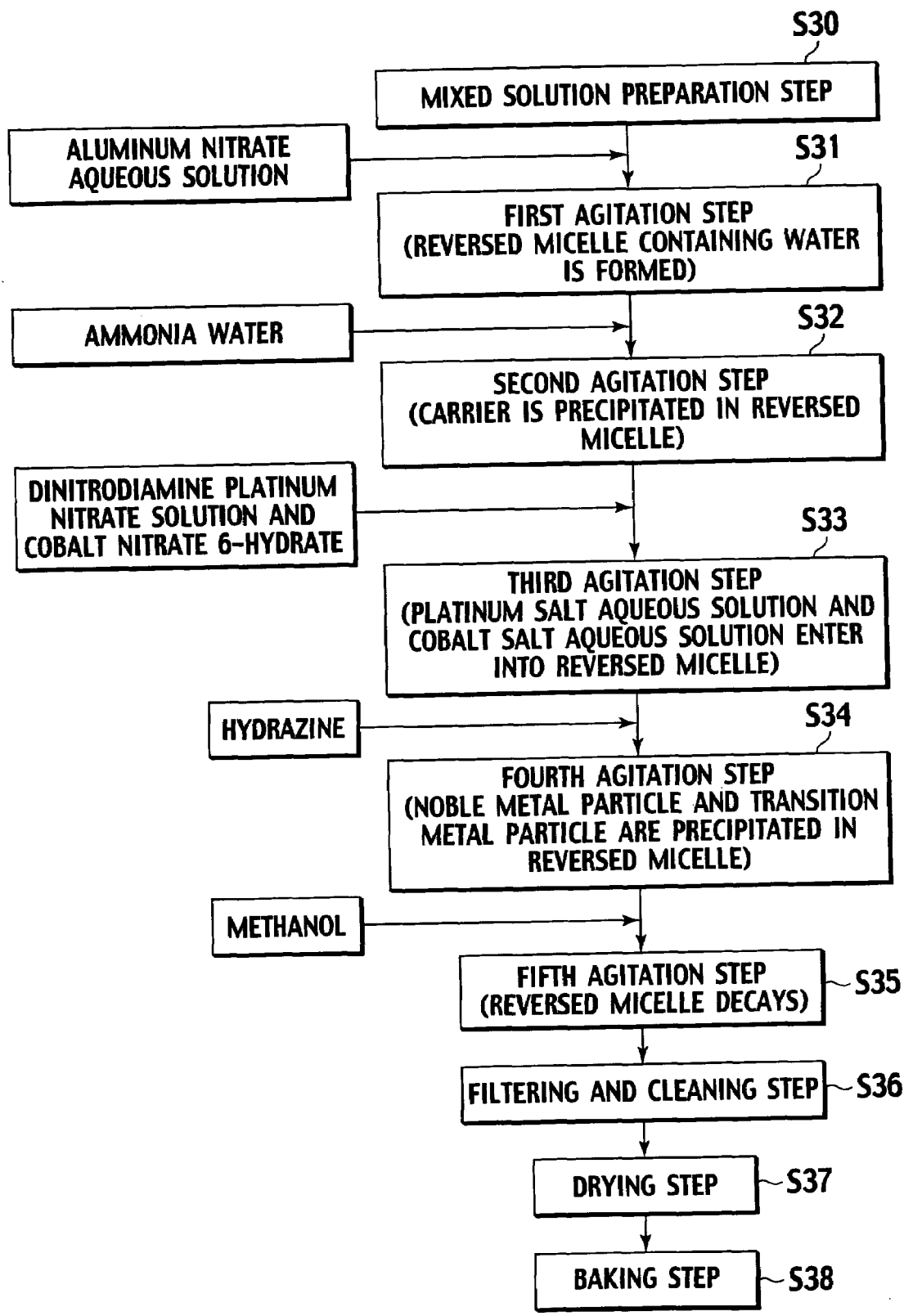
FIG. 4 is a process chart showing a method of producing catalyst powder of Example 2.

As shown in FIG. 4, in Example 2, aluminum nitrate was used as the carrier precursor, and platinum and cobalt were reduced simultaneously, thereby preparing catalyst powder.

5000 ml of cyclohexane was added as the solvent to 330 g of polyethylene glycol-mono-4-nonylphenyl ether as the surfactant, and a solution containing 0.15 mol/L of the surfactant was prepared (Step S30). An obtained mixture was agitated, and an aqueous solution was added thereto, in which 36.8 g of aluminum nitrate 9-hydrate was dissolved in pure water, thereby preparing a reversed micellar solution (Step S31).

Ammonia water of 25% was added to the reversed micellar solution thus prepared, and an obtained mixture was agitated for approximately two hours. Then, the aluminum nitrate was subjected to hydrolysis in a reversed micelle, and a reversed micellar solution containing the aluminum nitrate in the reversed micelle was prepared (Step S32).

Step S33 to Step S38 which follow were performed in a similar way to Step S23 to Step S28 which are shown in FIG. 4. In such a way, catalyst powder was obtained, in which Pt of 1.00% by weight and Co of 5.00% by weight were carried with respect to 1 g of $Al_2O_3$.

Note that an adding amount of the aluminum nitrate is equal in molar mass to the aluminum isopropoxide of Example 1, and that an adding amount of the ammonia water of 25% was set at an amount with which the aluminum nitrate can be sufficiently precipitated.

EXAMPLE 3

In Example 3, steps were basically executed in a similar way to Example 1. Example 3 is different from Example 1 in Step S23 and Step S24. In Step S23 and S24 here, only the dinitrodiamine platinum nitrate solution and the pure water were first added to the reversed micellar solution, sodium borohydride of which molar number was three times as much as that of platinum thus added was then added thereto, and an obtained mixture was agitated for approximately two hours, thereby reducing platinum ions. Subsequently, a cobalt nitrate aqueous solution was added to the reversed micellar solution, and hydrazine of which molar number was three times as much as that of cobalt thus added was added thereto, and an obtained mixture was agitated for approximately two hours, thereby reducing cobalt ions. Steps that follow were performed in a similar way to Example 1.

EXAMPLE 4

In Example 4, steps were basically executed in a similar way to Example 2. Example 4 is different from Example 2 in Step S31. In Step S31 here, aluminum nitrate 9-hydrate and cerium nitrate were mixed to prepare an aqueous solution, and a reversed micelle containing aluminum nitrate and cerium nitrate therein was prepared. Steps that follow were performed in a similar way to Example 2. Here, a mass ratio of the aluminum nitrate 9-hydrate and the cerium nitrate was set at 9:1 in conversion to oxides of aluminum and cerium. In such a way, catalyst powder of Example 4 was obtained, in which Pt of 1.00% by weight and Co of 5.00% by weight were individually carried with respect to 0.9 g of $Al_2O_3$ and 0.1 g of $CeO_2$.

Note that an adding amount of the ammonia water of 25% was set at an amount with which the aluminum nitrate and the cerium nitrate can be sufficiently subjected to hydrolysis.

EXAMPLE 5

In Example 5, steps were basically executed in a similar way to Example 2. Example 5 is different from Example 2 in Step S31. In Step S31 here, aluminum nitrate 9-hydrate and lanthanum nitrate were mixed to prepare an aqueous solution, and a reversed micelle containing aluminum nitrate and lanthanum nitrate therein was prepared. Steps that follow were performed in a similar way to Example 2. Here, a mass ratio of the aluminum nitrate 9-hydrate and the lanthanum nitrate was set at 20:1 in conversion to oxides of aluminum and lanthanum. In such a way, catalyst powder of Example 5 was obtained, in which Pt of 1.00% by weight and Co of 5.00% by weight were individually carried with respect to 0.95 g of $Al_2O_3$ and 0.05 g of $La_2O_3$.

Note that an adding amount of the ammonia water of 25% was set at an amount with which the aluminum nitrate and the lanthanum nitrate can be sufficiently subjected to hydrolysis.

EXAMPLE 6

In Example 6, cerium acetate was impregnated and carried with respect to 1 g of the catalyst powder obtained in Example 1 such that 5.00% by weight was carried as cerium. Thereafter, the catalyst powder was aspirated and filtered, and was then dried at 150° C. for 12 hours, followed by baking at 400° C. for an hour, thereby obtaining catalyst powder of Example 6.

EXAMPLE 7

In Example 7, steps were basically executed in a similar way to Example 1. Example 7 is different from Example 1 in Step S23. In Step S23 here, the dinitrodiamine platinum nitrate solution and a rhodium nitrate solution were mixed into the reversed micellar solution such that Pt of 1.00% by weight and Rh of 0.20% by weight were carried with respect to 1 g of $Al_2O_3$, and instead of the cobalt nitrate, zirconium nitrate equal thereto in molar mass was added.

EXAMPLE 8

In Example 8, steps were basically executed in a similar way to Example 1. Example 8 is different from Example 1 in Step S23. In Step S23 here, instead of the dinitrodiamine platinum nitrate solution, a palladium nitrate solution was mixed into the reversed micellar solution such that Pd of 0.500% by weight was carried with respect to 1 g of $Al_2O_3$, and instead of the cobalt nitrate, iron nitrate equal thereto in molar mass was added.

EXAMPLE 9

In Example 9, steps were basically executed in a similar way to Example 1. Example 9 is different from Example 1 in Step S23. In Step S23 here, the dinitrodiamine platinum nitrate solution was mixed into the reversed micellar solution such that Pt of 0.30% by weight was carried with respect to 1 g of $Al_2O_3$.

EXAMPLE 10

In Example 10, steps were basically executed in a similar way to Example 1. Example 10 is different from Example 1 in Step S22. In Step S22 here, instead of the aluminum isopropoxide, tetraethyl orthosilicate was mixed into the reversed micellar solution such that Pt of 1.00% by weight and Co of 5.00% by weight were carried with respect to 1 g of $SiO_2$.

EXAMPLE 11

In Example 11, steps were basically executed in a similar way to Example 1. Example 11 is different from Example 1 in Step S22. In Step S22 here, instead of the aluminum isopropoxide, titanium tetraisopropoxide was mixed into the reversed micellar solution such that Pt of 1.00% by weight and Co of 5.00% by weight were carried with respect to 1 g of $TiO_2$.

COMPARATIVE EXAMPLE 1

Figure 5:
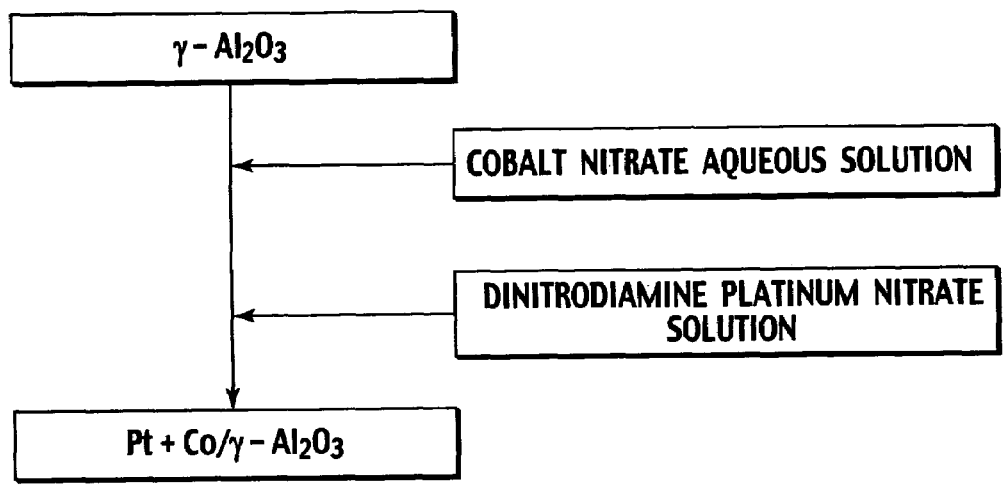
FIG. 5 is a process chart showing a method of producing catalyst powder of Comparative example 1.

Catalyst powder of Comparative example 1 was prepared by steps shown in FIG. 5.

5 g of aluminum oxide ($\gamma$-$Al_2O_3$) was dispersed in a cobalt nitrate aqueous solution in which 1.3 g of cobalt nitrate 6-hydrate was dissolved in pure water, and an obtained mixture was agitated for approximately an hour, followed by drying at 150° C. for 12 hours, thereby removing moisture therefrom. Moreover, the mixture was baked in airflow of 400° C. for an hour, and $Al_2O_3$ powder was thus obtained, on which Co of 5.00% by weight was carried.

Next, a solution was prepared, in which 0.61 g of dinitrodiamine platinum nitrate solution (platinum concentration: 8.46% by weight) and pure water were added together and agitated sufficiently. Into the solution thus prepared, the $Al_2O_3$ powder on which the cobalt was carried was added, and an obtained mixture was agitated for approximately an hour. Subsequently, the mixture was dried at 150° C. for 12 hours, and then baked in airflow of 400° C. for an hour, and $Al_2O_3$ powder was thus obtained, on which Pt of 1.00% by weight and Co of 5.00% by weight were carried.

COMPARATIVE EXAMPLE 2

Figure 6:
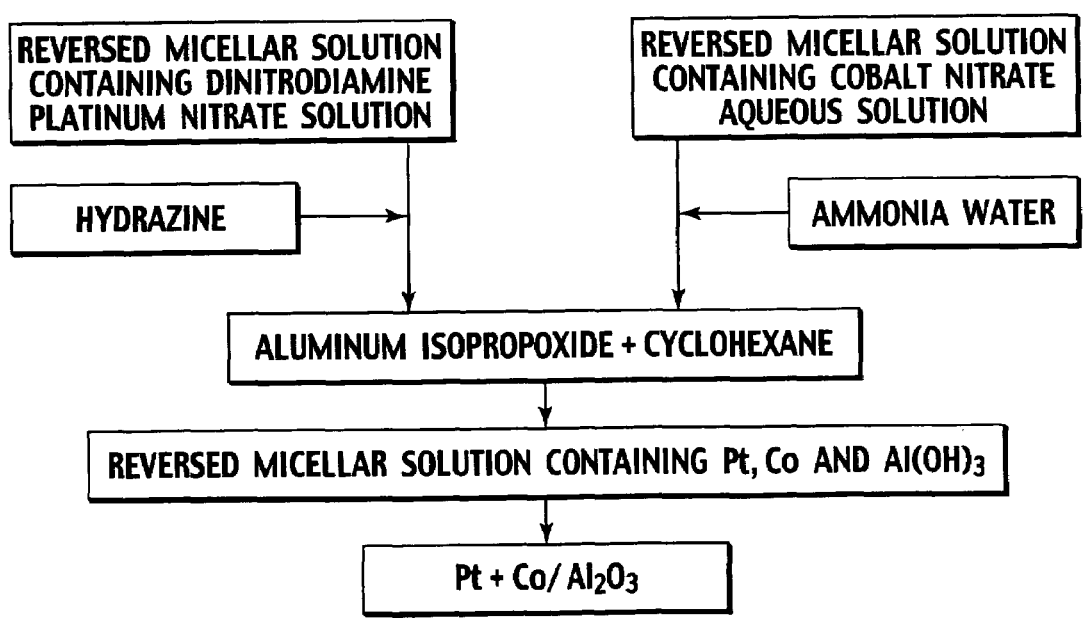
FIG. 6 is a process chart showing a method of producing catalyst powder of Comparative example 2.

Catalyst powder of Comparative example 2 was prepared by a method of a conventional technology as shown in FIG. 6.

First, cyclohexane was added to polyethylene glycol (5) mono-4-nonylphenyl ether, and a solution containing 0.15 mol/L of the surfactant was prepared. To this solution, a dinitrodiamine platinum nitrate solution (platinum concentration: 8.46% by weight) was added as the noble metal, an obtained mixture was agitated, and a reversed micellar solution containing platinum salt was thus prepared. Subsequently, hydrazine was added to the reversed micellar solution, an obtained mixture was agitated for approximately two hours, and a reversed micellar solution containing platinum particles was thus prepared.

Separately from the above, cyclohexane was added to polyethylene glycol (5) mono-4-nonylphenyl ether, and a solution containing 0.15 mol/L of the surfactant was prepared. To this solution, cobalt nitrate 6-hydrate was added as the transition metal, an obtained mixture was agitated, and a reversed micellar solution containing transition metal salt was thus prepared. Subsequently, ammonia water of 25% was added to the reversed micellar solution, an obtained mixture was agitated for approximately two hours, and a reversed micellar solution containing cobalt particles was thus prepared.

Moreover, the reversed micellar solution containing the platinum particles and the reversed micellar solution containing the cobalt particles were dropped into a mixed solution of cyclohexane and aluminum isopropoxide, and an obtained solution was agitated for approximately two hours. Subsequently, methanol was added to the solution, and an obtained mixture was agitated for approximately two hours. The reversed micelle thus decays, and platinum, cobalt and the carrier were deposited. Furthermore, the deposit was filtered to be separated from the solvent, and a deposit thus obtained was cleaned by alcohol and pure water, thereby removing impurities such as an extra surfactant. The deposit was then dried at 100° C. for 12 hours, followed by baking in airflow of 400° C. In such a way, catalyst powder was obtained, in which Pt of 1.00% by weight and Co of 5.00% by weight were carried with respect to 1 g of $Al_2O_3$.

Using each catalyst powder of Example 1 to Example 11 and Comparative example 1 and Comparative example 2, which are described above, an exhaust gas purifying catalyst was produced.

Specifically, each 50 g of the catalyst powder, 10 g of boehmite and 157 g of a 10% nitric acid solution were put into an alumina-made magnetic pot, and shaken and milled together with alumina balls, and slurry was thus obtained.

Subsequently, the slurry was put into a cordierite-made honeycomb substrate (900 cell/2.5 mil; and volume: 0.06 L), and extra slurry was removed by airflow, followed by drying at 120° C. and baking in airflow of 400° C. In such a way, each catalyst of Example 1 to Example 11 and Comparative example 1 and Comparative example 2 was produced.

A durability test to be described below was performed for each obtained catalyst, and purification performance thereof was evaluated.

In the durability test, a V6 engine made by Nissan Motor Co., Ltd. was used, and lead-free gasoline was used as fuel. In the durability test, a jig capable of adjusting a flow rate of exhaust gas to the honeycomb substrate was used. A position of the catalyst was then adjusted such that temperature of an inlet of each catalyst became 750° C., and the engine was operated for 30 hours. Thereafter, the catalyst after the durability test was cut to set a catalyst volume at 40 cc, and the performance thereof was evaluated. Note that, with regard to conditions for the performance evaluation for each catalyst, reaction gas shown in Table I was used, and an A/F ratio thereof was set in a stoichiometric state.

TABLE 1

| Composition | Concentration |
| --- | --- |
| NO | 1000 ppm |
| CO | 0.60% |
| $H_2$ | 0.20% |
| $O_2$ | 0.60% |

TABLE 1-continued

| Composition | Concentration |
| --- | --- |
| $CO_2$ | 13.9% |
| HC | 1665 ppmC |
| $H_2O$ | 10% |
| $N_2$ | Rest |

Moreover, the performance of each catalyst was evaluated under conditions where a flow rate of the reaction gas was 40 L/min and temperature of the reaction gas was 300° C. Moreover, a ratio of a NOx concentration at the inlet of each catalyst and a NOx concentration at an outlet thereof was measured when these concentrations were stabilized, and based on the ratio, a NOx purification rate (%) was calculated. Compositions of the respective catalyst powders and evaluation results thereof are shown in FIG. 7.

In the results shown in FIG. 7, after the durability tests, the respective catalyst powders in Example 1 to Example 7 exhibit high NOx purification rates, which are 51% or more, because the catalyst powders carried Pt of 1.00% by weight and Co, Fe, Zr and the like of 5.00% by weight on the carrier. As opposed to this, in Comparative example 1 and Comparative example 2, NOx purification rates of both thereof after the durability tests indicate low values which are 44% or less though the carrying concentrations of Pt and Co were set at 1.00% by weight and 5.00% by weight, respectively, in a similar way to Example 1 to Example 7. From the above, it was proven that the NOx purification rates in Comparative examples were lower. The reason for this is conceived as follows. Specifically, because alumina particles of the carrier of Comparative example 1 had a size of approximately several microns, the platinum and the cobalt, which were carried thereon, became separated from each other, and the catalytic activity was not able to be exerted sufficiently. Moreover, in Comparative example 2, the reason is also conceived as follows. Specifically, because the platinum and the cobalt were prepared in the separate micelles, the platinum and the cobalt were carried separately from each other, a promoter effect of the cobalt was not exerted, and the catalytic activity was lowered. Meanwhile, in the catalyst powder of Example 9, the NOx purification rate was low which was 42%. However, this resulted from the lowering of the carrying concentration of the platinum to 0.30% by weight. Even if the carrying concentration of the platinum was lowered as described above, a NOx purification rate higher than that of Comparative example 1 was obtained by carrying the cobalt of 5.00% by weight. As a result, the catalyst of this application of the invention can decrease an amount of usage of expensive noble metal such as the platinum, and accordingly, production cost of the catalyst can also be reduced. Moreover, in Example 10 and Example 11, in which the platinum and the cobalt were carried on $SiO_2$ and $TiO_2$ respectively, higher NOx purification rates than that of Comparative example 1 were obtained. Accordingly, it is conceived that the catalyst is highly heat-resistant even in the case of using the above-described compounds as the carrier.

Moreover, in the method of producing catalyst powder according to the embodiment of the present invention, the carrier precursor is mixed into the reversed micellar solution, and the carrier precursor in the reversed micelle was deposited, thereby preparing the carrier. Accordingly, the specific surface area of the carrier of this embodiment becomes larger than that of the conventional carrier. In order to actually verify this fact, $Al_2O_3$ shown below, which was used for each catalyst powder of Example 1 and Comparative example 1, was evaluated in the following manner. For such evaluations, the alumina for each of Example 1 and Comparative example 1 was baked at 400° C., 600° C. and 800° C., and specific surface areas of each alumina after baking was measured. For the measurements of the specific surface areas, a measurement device (Micromeritics FlowSorb III 2305 made by Shimadzu Corporation) was used, and the measurements were performed by an $N_2$ gas adsorption method in accordance with the BET method. Note that a volume of a cell used in the measurements was set at 4.8 $cm^3$. Table 2 shows BET specific surface areas of $Al_2O_3$ in Example 1 and Comparative example 1. These results are graphed in FIG. 8.

TABLE 2

| | Baking temperature (° C.) | BET specific surface area ($m^2$/g) |
| --- | --- | --- |
| Example | 400 | 290 |
| | 600 | 255 |
| | 800 | 210 |
| Comparative example | 400 | 180 |
| | 600 | 140 |
| | 800 | 100 |

Figure 8:
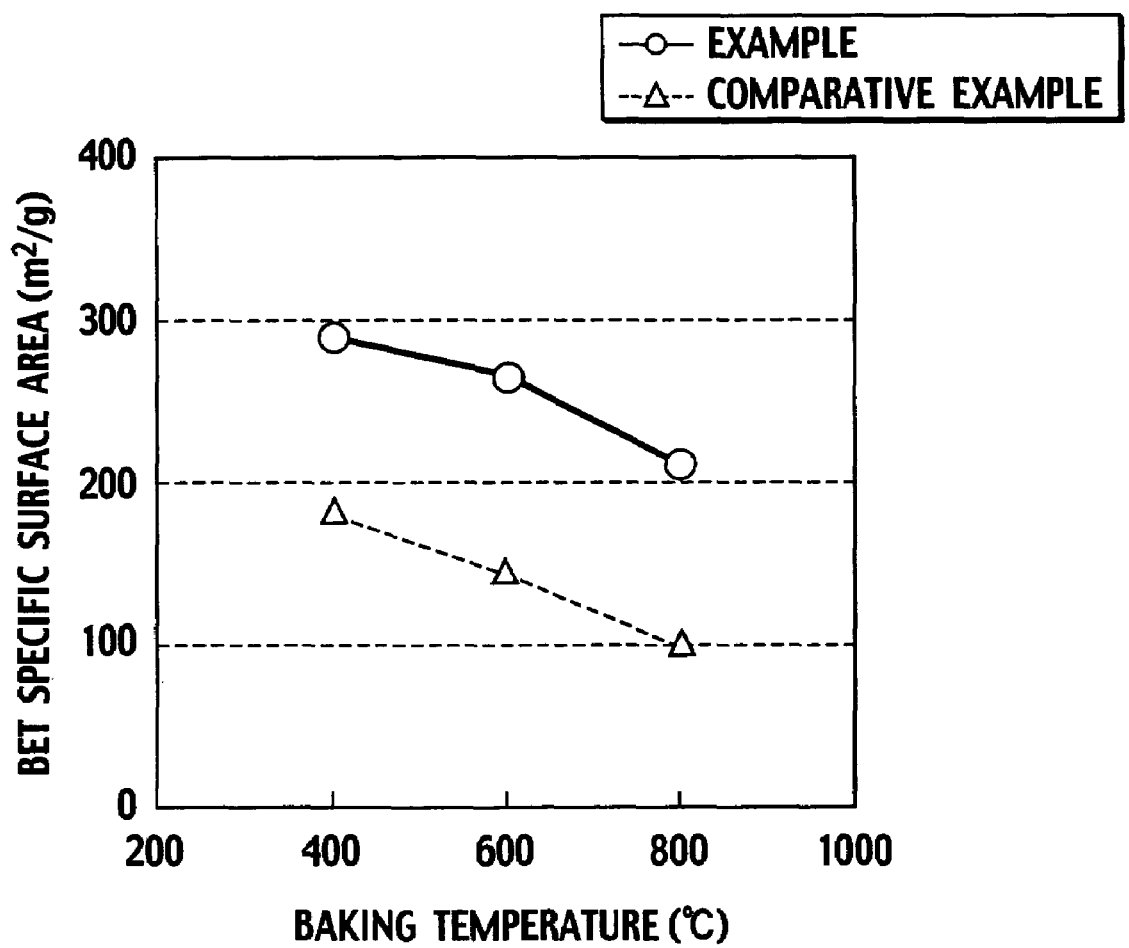
FIG. 8 is a graph showing relationships between baking temperatures of alumina and BET specific surface areas in Examples and Comparative examples.

As shown in Table 2 and FIG. 8, in $Al_2O_3$ of Comparative example 1 using the impregnation method, the specific surface area in the high temperature range from 600° C. to 800° C. is lowered to a great extent. Meanwhile, in $Al_2O_3$ of Example 1 using the reversed micelle method, not only the specific surface area is large, but also the lowering degree of the specific surface area in the high temperature range is small. Accordingly, it was proven that, in Example 1, a large specific surface area could be maintained even in the high temperature range. In $Al_2O_3$ of Comparative example 1, the aggregation of the activators occurs in the high temperature range, and the catalytic activity is lowered. Meanwhile, in $Al_2O_3$ of Example 1, the aggregation of the activators in the high temperature range can be prevented, and as a result, it was proven that the heat resistance could be improved.

Finally, using the respective catalysts produced by the production methods of the above-described Example 1 and Comparative example 1, the respective particle diameters of the noble metal particles and the transition metal particles were measured by the TEM-EDX measurement. For the respective catalyst powders, ones baked at 800° C. in the air atmosphere for three hours were used. With regard to the measurements of the particle diameters, the respective catalyst powders were first subjected to an inclusion treatment by epoxy resin, and after the epoxy resin was cured, extremely thin slices were prepared by ultramicrotome. Using the prepared slices, dispersed states of crystal particles were investigated by means of a transmission electron microscope (TEM, HF-2000 made by Hitachi, Ltd.). At this time, acceleration voltage was set at 200 kv. Contrast portions in images thus obtained were focused to specify types of the metals, and particle diameters of the respective metals specified were measured. As a result, in the catalyst powder of Example 1, the particle diameter of platinum was 4.5 nm, and the particle diameter of cobalt was 30 nm. Meanwhile, in the catalyst powder of Comparative example 1, the particle diameter of platinum was 11.1 nm, and the particle diameter of cobalt was 55 nm. Also from the above, it is understood that the catalyst of the present invention can restrict the aggregation of the noble metal even under the high temperature conditions, and can maintain good performance.

The entire content of a Japanese Patent Application No. P2004-106667 with a filing date of Mar. 31, 2004 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. Catalyst powder, comprising:
    a porous carrier; and
    a noble metal particle and a transition metal particle, which are carried on the carrier,
    wherein at least a part of the transition metal particle contacts the noble metal particle, is bound with the carrier to form a composite compound contacting the noble metal particle, or forms a composite particle together with the noble metal particle,
    wherein a particle diameter of the noble metal particle is within a range from 0.1 nm to 10 nm, and a particle diameter of the transition metal particle is within a range from 1 nm to 50 nm.

2. The catalyst powder according to claim 1,
    wherein the noble metal particle comprises at least one selected from the group consisting of ruthenium, rhodium, palladium, silver, iridium, platinum and gold.

3. The catalyst powder according to claim 1,
    wherein the transition metal particle comprises at least one selected from the group consisting of iron, cobalt, nickel, copper and manganese.

4. The catalyst powder according to claim 1, further comprising:
    a compound formed of at least one element selected from the group consisting of cerium, neodymium, praseodymium, lanthanum, zirconium, barium, and magnesium.

5. The catalyst powder according to claim 1,
    wherein the carrier is at least one selected from the group consisting of alumina, ceria, titania, zirconia and silica.

6. The catalyst powder according to claim 1,
    wherein the catalyst powder is capable of purifying exhaust gas discharged from an internal combustion engine.

7. The catalyst powder according to claim 1,
    wherein the carrier is formed of alumina, and a specific surface area of the carrier is 200 $m^2/g$ or more after the carrier is baked for 3 hours in an airflow of 600° C.

8. The catalyst powder according to claim 1,
    wherein the carrier is formed of alumina, and a specific surface area of the carrier is 200 $m^2/g$ or more after the carrier is baked for 3 hours in an airflow of 800° C.

* * * * *